United States Patent
Kobayashi

(10) Patent No.: US 10,316,999 B2
(45) Date of Patent: Jun. 11, 2019

(54) PRESSURE PIPE CONNECTION METHOD AND METHOD FOR CONSTRUCTING PRESSURE PIPE WITH FLANGE

(71) Applicant: NIHONKANSEN KOGYO KABUSHIKI KAISHA, Fukuyama-shi Hiroshima (JP)

(72) Inventor: Masato Kobayashi, Fukuyama (JP)

(73) Assignee: NIHONKANSEN KOGYO KABUSHIKI KAISHA (JP)

(*) Notice: Subject to any disclaimer, the term of this patent is extended or adjusted under 35 U.S.C. 154(b) by 0 days.

(21) Appl. No.: 15/550,828

(22) PCT Filed: Sep. 8, 2015

(86) PCT No.: PCT/JP2015/075383
§ 371 (c)(1),
(2) Date: Aug. 14, 2017

(87) PCT Pub. No.: WO2017/042874
PCT Pub. Date: Mar. 16, 2017

(65) Prior Publication Data
US 2018/0328524 A1 Nov. 15, 2018

(30) Foreign Application Priority Data
Feb. 16, 2015 (EP) .................. 15000453

(51) Int. Cl.
*F16L 21/08* (2006.01)
*F16L 25/06* (2006.01)
(Continued)

(52) U.S. Cl.
CPC ............ *F16L 21/08* (2013.01); *F16L 23/024* (2013.01); *F16L 23/0283* (2013.01); *F16L 23/032* (2013.01); *F16L 25/065* (2013.01)

(58) Field of Classification Search
CPC ........ F16L 21/08; F16L 23/024; F16L 21/065; F16L 23/0283; F16B 2200/503
See application file for complete search history.

(56) References Cited

U.S. PATENT DOCUMENTS 1,377,418 A * 5/1921 Krogh .................. E21B 17/046
279/83
2,111,243 A * 3/1938 Hecht ..................... F16L 25/08
285/154.1
(Continued)

FOREIGN PATENT DOCUMENTS

| JP | 48692 | 5/1919 |
| JP | 51-9667 | 3/1976 |

(Continued)

OTHER PUBLICATIONS

Machine Translation of JP2011127672A (Year: 2011).*
(Continued)

*Primary Examiner* — Jacob J Cigna
*Assistant Examiner* — Michael W Hotchkiss
(74) *Attorney, Agent, or Firm* — Merek, Blackmon & Voorhees, LLC

(57) ABSTRACT

Provided is a pressure pipe connection structure that reduces man-hours for machining one or more pressure pipes and does not require high machining precision. Multiple arc members form a ring shape that makes a circle by matching the end faces thereof to each other. Non-penetrating holes may be provided on the outer circumference of the arc members. The ring formed by the multiple arc members has an inner diameter that is smaller than the outer diameter and larger than the inner diameter of a pressure pipe. A cylindrical sleeve has an inner cylindrical surface inside which the entire outer circumferences of arc members are fitted into a hollow internal space, into which respective one or more pressure pipes are inserted from one or more opposing (Continued)

entrances; and multiple through holes, which penetrate from the outside and are provided with female thread ridges. The one or more pressure pipes are cut to a certain length that is suited to the placement site and a groove is grooves cut in the corresponding pressure pipe. The arc members are fitted into the groove, and the arc members are positioned on an inner cylindrical surface by inserting the one or more pressure pipes into a sleeve, the respective through holes and non-penetrating holes are made to communicate with each other, and the one or more pressure pipes are fixed using bolts.

6 Claims, 11 Drawing Sheets

(51) Int. Cl.
*F16L 23/024* (2006.01)
*F16L 23/028* (2006.01)
*F16L 23/032* (2006.01)

(56) References Cited

U.S. PATENT DOCUMENTS

| | | | | |
|---|---|---|---|---|
| 2,211,983 A | * | 8/1940 | Wright | F16L 17/08 |
| | | | | 277/614 |
| 2,472,307 A | * | 6/1949 | Nagel | G03B 17/12 |
| | | | | 285/383 |
| 3,018,120 A | * | 1/1962 | Vann | F16L 23/125 |
| | | | | 277/607 |
| 4,529,232 A | * | 7/1985 | Schaeffer | B29C 47/0847 |
| | | | | 285/415 |
| 5,355,908 A | * | 10/1994 | Berger | F16L 15/001 |
| | | | | 137/614.04 |
| 7,107,662 B1 | * | 9/2006 | Levario | F16L 23/125 |
| | | | | 277/608 |
| 9,217,525 B2 | | 12/2015 | Kobayashi et al. | |
| 9,253,450 B2 | | 12/2016 | Kobayashi et al. | |
| 9,759,378 B2 | * | 9/2017 | Wiedemeier | F17C 1/02 |
| 2005/0253382 A1 | * | 11/2005 | Gibb | F16L 17/04 |
| | | | | 285/111 |
| 2012/0274062 A1 | * | 11/2012 | Sato | F16L 21/04 |
| | | | | 285/305 |
| 2013/0285374 A1 | | 10/2013 | Kobayashi et al. | |
| 2014/0357964 A1 | * | 12/2014 | Wisniewski | A61B 5/742 |
| | | | | 600/301 |
| 2014/0367964 A1 | | 12/2014 | Kobayashi et al. | |

FOREIGN PATENT DOCUMENTS

| | | | | |
|---|---|---|---|---|
| JP | 59-62790 | | 4/1980 | |
| JP | 2003-180011 | | 6/2003 | |
| JP | 2009299298 A | * | 12/2009 | E02D 5/24 |
| JP | 2010-180957 | | 8/2010 | |
| JP | 2011127672 A | * | 6/2011 | F16L 13/10 |
| JP | 5646653 | | 12/2014 | |
| KR | 20060016202 A | * | 2/2006 | F16L 21/08 |
| WO | WO 2012/096042 | | 7/2012 | |
| WO | 2013/118346 | | 8/2013 | |

OTHER PUBLICATIONS

Machine Translation of KR200600016202A (Year: 2006).*
Machine Translation of JP2009299298A (Year: 2009).*
Machine Translation of KR20060016202A (Year: 2006).*
Machine Translation of JP2011127672A (Year: 2009).*
International Search Report dated Dec. 8, 2015 issued in connection with International Application No. PCT/JP2015/075383 (two pages).

* cited by examiner

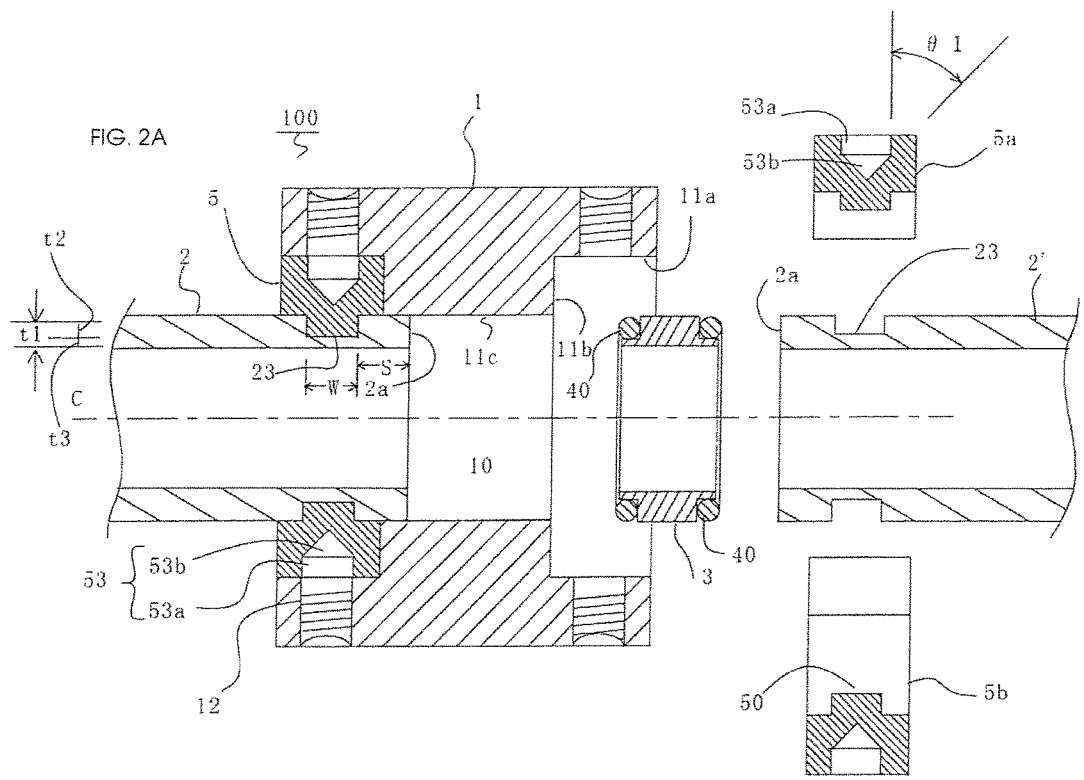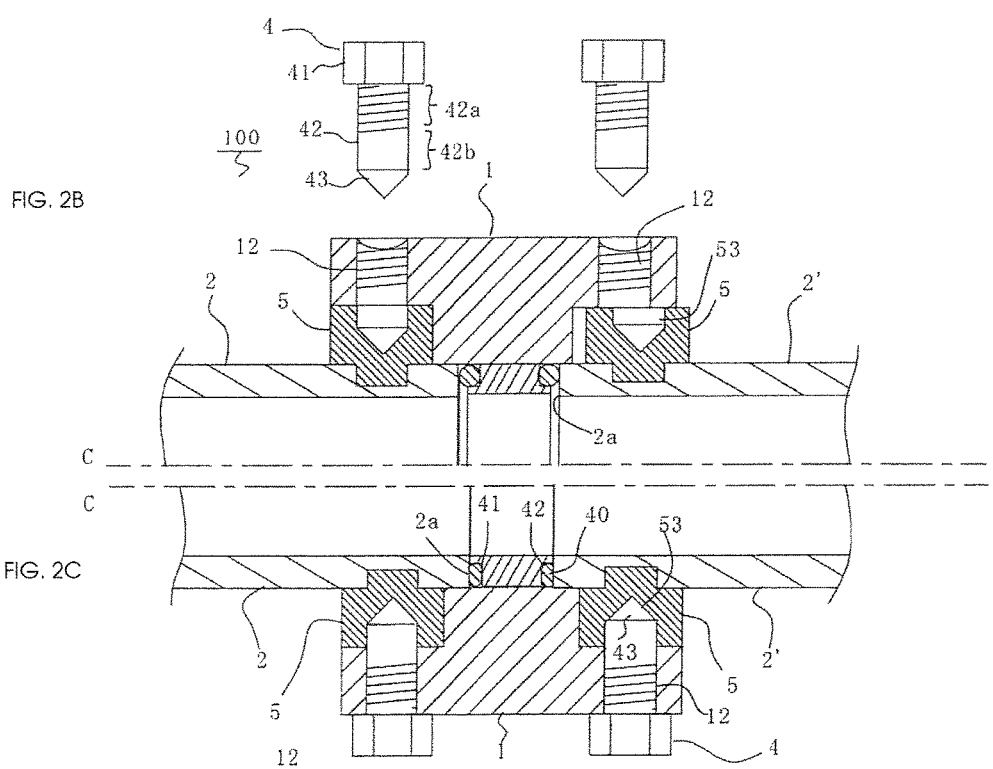

FIG. 11A
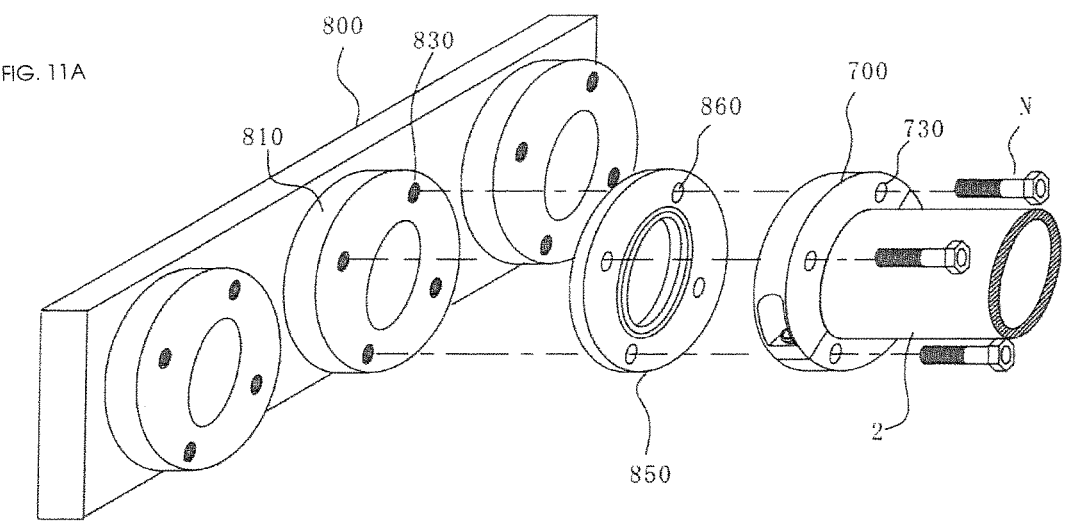
FIG. 11B
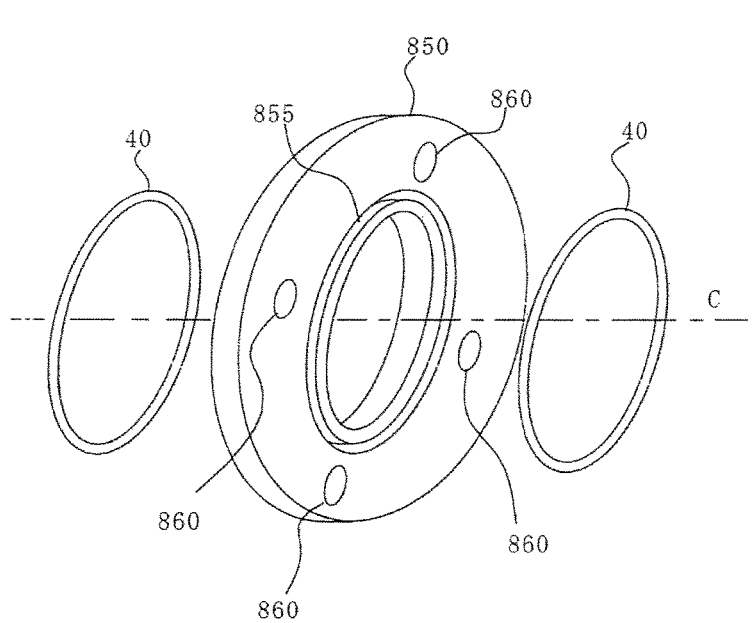
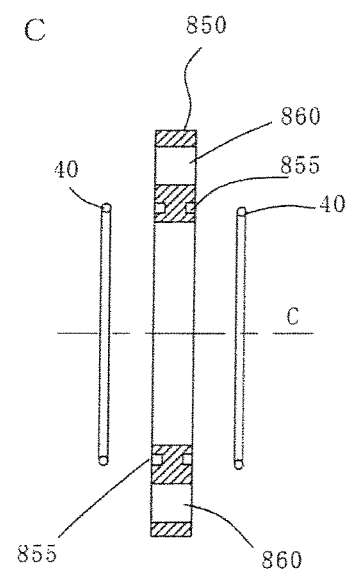

US 10,316,999 B2

PRESSURE PIPE CONNECTION METHOD AND METHOD FOR CONSTRUCTING PRESSURE PIPE WITH FLANGE

TECHNICAL FIELD

The present invention relates to a pressure pipe connection method and a method for constructing pressure pipes with a flange that enable connecting pressure pipes cut to a certain length that is suited to a placement site without requiring welding.

BACKGROUND ART

A carbon steel pipe (STPG) is used as a steel pipe for pressure piping. The carbon steel pipe has a minimum yield load and a breaking strength determined by the Japanese Industrial Standards (JIS). On the other hand, a coupling joint for connecting pressure pipes requires the yield load and the breaking strength exceeding those of the pressure pipes. Specifically, a tension test sets a joint strength to such strength that the connected pressure pipe base material should be cut. In addition, in the welding connection, the pressure pipe is required to extend a leg length on the entire circumference in order to keep such weld strength that the pressure pipe base material should be cut in the same way. Such a welding work requires skill, and therefore, the person who can perform the work is limited.

The connecting means without welding is means for adhesive or bolts. For example, both of patent literatures 1 and 2 disclose means for connecting pipe and pipe by bolts. These technologies are to fix the pipes, wherein electric wires are housed, by deforming the pipe side by fastening force of the bolts screwed on peripheral walls of the pipes along their radial direction. These pipes are to protect the inner electric wires, and the electric wires in themselves do not either have pressure or leak. Patent literature 3 discloses a technology for connecting poles by the bolts, wherein the poles are fixed by deforming the side surface by fastening force of the bolts.

On the other hand, the applicant previously has proposed a pressure pipe connection technology for guiding high-pressure fluid without using welding, wherein bolts are used as connecting means as shown in patent literature 4. There are provided a plurality of non-penetrating holes on the pressure pipes, and the pressure pipes are fixed by the bolts from a surface of a sleeve for externally fitting the pressure pipes towards the non-penetrating holes. The non-penetrating holes provided on the pressure pipe reduces the breaking strength of the pressure pipe itself. The patent literature 4 discloses that the non-penetrating holes are arranged on the pressure pipe at equal angular intervals on the entire circumference so as not to be overlapped to each other in the direction of the center line to disperse stresses in order to make the strength of the connecting portion exceed the yield load required for the pressure pipe (when the pressure pipe is STPG370, the value specified by standards is 370 N/mm$^2$).

RELATED ART DOCUMENTS (I.E., PATENT DOCUMENTS)

Patent literature 1: Japanese Examined Utility Model Application Publication No. 51-9667
Patent literature 2: Japanese Unexamined Patent Application Publication No. 2003-180011
Patent literature 3: Japanese Unexamined Patent Application Publication No. 2010-180957
Patent literature 4: WO 2012/096042A1

SUMMARY OF THE INVENTION AND OBJECT TO BE SOLVED BY THE INVENTION

According to the connection structure shown in the patent literature 4, in piping work of the pressure pipes requiring a tensile strength, the pressure pipes can be connected by the bolts without using welding. However, boring is an operation to open many non-penetrating holes on the pressure pipes cut to a required length corresponding to the number of the bolts, and therefore, many machining man-hours are required. Besides, because the non-penetrating holes are dispersedly opened in a longitudinal direction of the pressure pipes, a tool excellent in machining accuracy has been required.

It is an object of the present invention to provide a pressure pipe connection method and a method for constructing pressure pipes with a flange, which reduce man-hours for machining the pressure pipes and never require the excellent machining accuracy.

Means to Solve the Problem

A preferred form of the present invention to overcome the above-identified problems is as follows. A preferred form of the present invention is a pressure pipe connection method for flowing pressurized fluid, by preparing a plurality of arc members formed in a ring shape that makes a circle by matching end faces, wherein the arc members respectively have non-penetrating holes on the outer circumferences and an inner diameter smaller than an outer diameter of the pressure pipes and larger than an inner diameter of the pressure pipes, preparing a cylindrical sleeve in an inside hollow where the pressure pipes are inserted from opposing entrances to each other, wherein the cylindrical sleeve has a plurality of through holes with female threads penetrating through from the outside at positions corresponding to the non-penetrating holes and an inner cylindrical surface for externally fitting the outer circumferences of the arc members formed in the ring shape on the entire circumference, preparing a plurality of bolts for being screwed into the through holes of the sleeve, cutting the pressure pipes to a certain length that is suited to a placement site, cutting grooves into which the arc members are fitted on positions distant from the cut ends of the pressure pipes, fitting the arc members into each groove to form a ring, inserting the pressure pipes into the hollow inside the sleeve and positioning the arc members fitted into the grooves on the inner cylindrical surface to communicate the through holes and the non-penetrating holes to each other, and fixing the pressure pipes through the through holes of the sleeve using the bolts.

Further, another preferred form of the present invention to overcome the above-identified problems is as follows. This preferred form of the present invention is a method for constructing pressure pipe with a flange for flowing pressurized fluid in its inside, by preparing a plurality of arc members for forming a ring shape that makes a circle by matching end faces, wherein the arc members respectively have non-penetrating holes on the outer circumferences and an inner diameter smaller than an outer diameter of the pressure pipes and larger than an inner diameter of the pressure pipes, preparing a cylindrical flange in an inside hollow where the pressure pipes are inserted from opposing entrances to each other, wherein the cylindrical flange has an inner cylindrical surface for externally fitting the outer circumferences of the arc members formed in the ring shape on the entire circumference and a plurality of through holes with female threads penetrating through from an outside at positions corresponding to the non-penetrating holes and horizontal holes bored along the circumference at equal angular intervals in a direction of a center line of the hollow, preparing a plurality of bolts for being screwed into the through holes of the flange, cutting the pressure pipes to a certain length that is suited to a placement site, cutting grooves into which the arc members are fitted on positions distant from the cut ends of the pressure pipes, fitting the arc members into each groove to form a ring, inserting the pressure pipes into the hollow inside the flange and positioning the arc members fitted into the grooves on the inner cylindrical surface to communicate the through holes and the non-penetrating holes to each other, and fixing the pressure pipes through the through holes of the flange using the bolts.

Effects of the Invention

According to the present invention, there is an effect that piping work is performed with reducing machining man-hours for the pressure pipes and without requiring high machining skill because a work for cutting a groove, into which the arc members are fitted, for the pressure pipes cut to an even required length can be performed comparatively easily and accurately by utilizing a lathe and, once the cutting work is done, the remaining piping work can be completed by combing parts such as a sleeve, flange and bolts prepared previously.

BRIEF DESCRIPTION OF THE DRAWINGS

FIGS. 2A and 2B are views showing a connection structure of an embodiment utilizing a sleeve joint.
FIGS. 11A, 11B and 11C are views showing a connection utilizing the flange of Example 7 where the flange is connected to a pressure pipe and other machinery.

MODE FOR CARRYING OUT PREFERRED EMBODIMENTS OF THE INVENTION

A pressure pipe connection structure for connecting two pressure pipes or a pressure pipe to another element (e.g. other machinery) using connection strength by bolts will be concretely explained with reference to figures as follows.

Some connection structures that will be explained below as embodiments of the preferred forms of the present invention include a connection structure by a sleeve joint and a connection structure by a flange joint. First of all, the principle common to these embodiments will be explained. In the patent literature 4, in order to make the strength of the connection part exceed yield load required for the pressure pipe, non-penetrating holes are formed on the pressure pipe at equal angular intervals on the entire circumference so as not to be overlapped to one another in a direction of a center line to disperse stress.

In the present invention, machining for forming a groove, which makes a circle with the same width, on the pressure pipe is applied on a position away from the end of the pressure pipe. According to the patent literature 4, it is considered that the thick-wall part of the pressure pipe is cut away on the entire circumference to decrease the strength of the connection part and not to reach the yield load required for the pressure pipe.

Figure 1A:
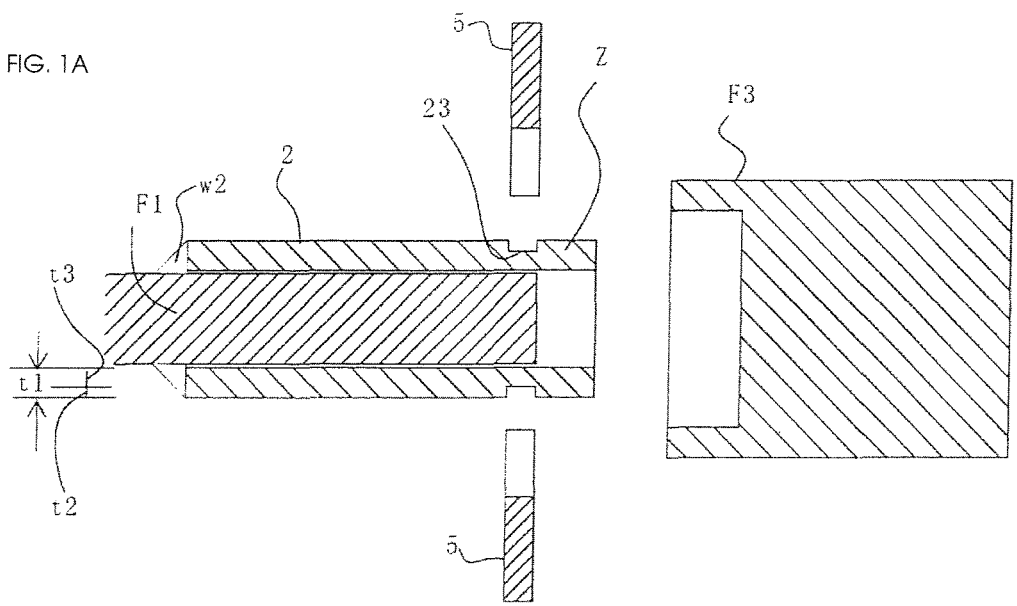
FIGS. 1A and 1B are views showing examples of experimentation.
Figure 1B:
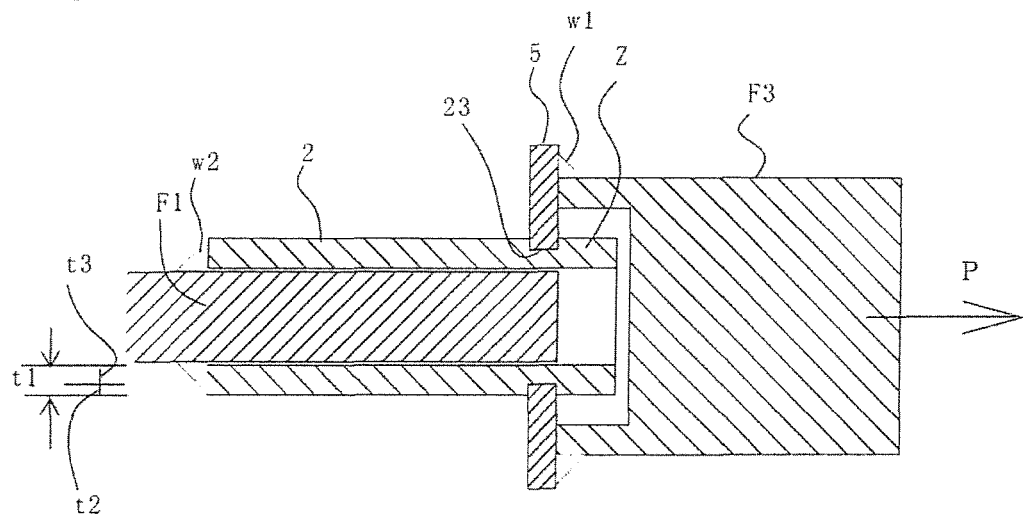

In an experiment, it was confirmed whether or not a structure of the connection part was deformed when the thick-wall part of the pressure pipe was cut away on the entire circumference. In a device of FIGS. 1A and 1B, two samples of STPG370 sch40 20A pipe having a thickness t1 of 3.9 mm were used as a pressure pipe 2. In the sample of FIG. 1A, a groove 23 has a depth t2 of 1.5 mm on the entire circumference and the pressure pipe 2 has a residual wall thickness t3 of 2.4 mm. In the sample of FIG. 1B, the groove 23 has the depth t2 of 1.0 mm on the entire circumference and the pressure pipe 2 has the residual wall thickness t3 of 2.9 mm. The STPG370 sch40 20A pipe has a proof stress (a yield point) equal to or greater than 48 KN and a breaking stress equal to or greater than 82 KN on standards. A ring 5 is fitted into the groove 23, a welding w1 is applied to a jig F3, and a tensile force P is applied on an iron rod F1. Besides, an outer diameter of the iron rod F1 is smaller than an inner diameter of the pressure pipe 2, so that the iron rod F1 can be inserted into the pressure pipe 2, and a portion between the pressure pipe 2 end and the iron rod F1 is welded w2 with a leg length corresponding to the thickness of the pressure pipe 2.

When the tensile stress P of 89.5 KN was applied on the sample of FIG. 1A or when the tensile stress P of 64.6 KN was applied on the sample of FIG. 1A, a portion Z was cut off from the groove 23. A cut surface was ruptured almost vertically at a position where it enters slightly from a corner part of the bottom of the groove 23 toward a center of the groove 23. At this time, it is considered that the connection structure using the groove 23 and the ring 5 is destroyed.

Both samples were respectively confirmed that the connection part had the strength equal to or greater than the proof stress required for the pressure pipe 2. It is assumed that the stress is dispersed on the entire circumference because the groove 23 makes a circle with the same width on the entire circumference of the pressure pipe. Besides, because the thickness of the groove 23 portion is thinned, when a tensile force near the yield point (equal to or greater than 48 KN) is applied on the pressure pipe 2, the pressure pipe may be deformed by the force equal to or lower than the yield point. However, because the length of the portion Z does not change, compression pressure applied on a seal member such as an O-ring that will be described later remains unchanged, and therefore, it doesn't follow that the groove 23 portion was destroyed as for the connection structure.

Example 1

FIGS. 2A and 2B show a connection structure 100 relating to the first embodiment, which shows an example of a sleeve joint for connecting pressure pipes. The connection structure 100 includes a sleeve 1, pressure pipes 2 and 2', an insert 3, a plurality of bolts 4 and a ring 5. The sleeve 1, the insert 3, the bolts 4 and the ring 5 are mass produced at a factory in advance. On the other hand, although the pressure pipes 2 and 2' themselves are standardized mass-produced articles, their lengths are cut and adjusted corresponding to an equipment installed thereto.

The sleeve 1 is a straight cylinder having a hollow 10 into which the pressure pipes 2 and 2' are respectively inserted from opposing entrances to each other. Each of the entrances is provided with a step 11b retreating radially outside on the entire circumference of the sleeve. The step 11b radially retreats from the hollow 10 and reaches inner cylindrical surface 11a externally fitting the outer circumference of the pressure pipe 2. The inner cylindrical surface 11a is always positioned on the closest portion for an exit of the total length of the sleeve 1. If the inner cylindrical surface 11a is not positioned on the closest portion for the exit, a narrow-diameter portion should not be present between the inner cylindrical surface 11a and the exit.

Figure 3A:
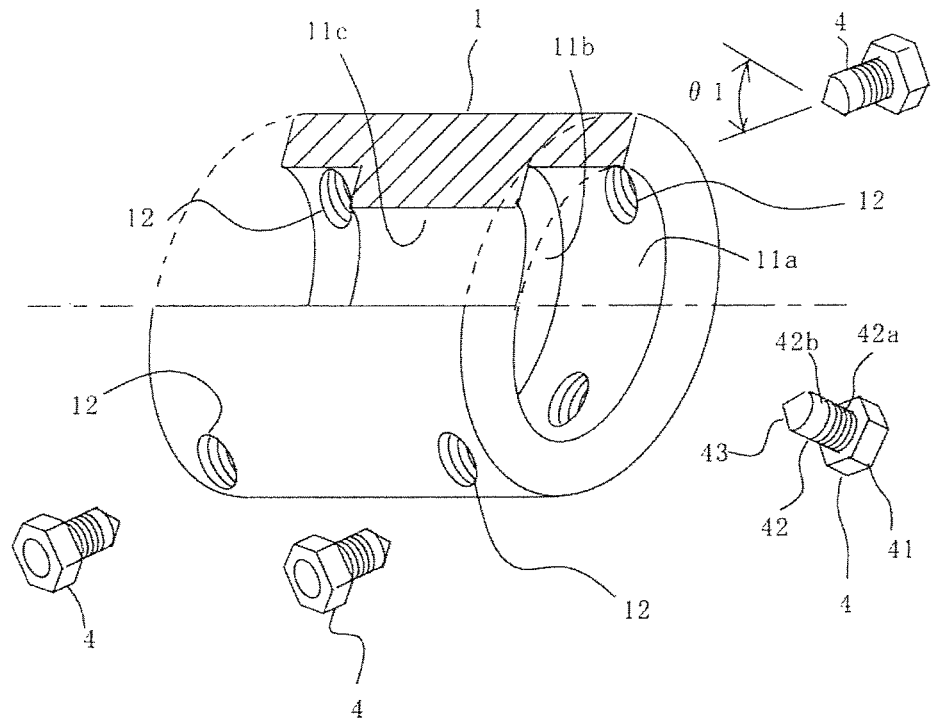
FIG. 3A is a view showing a sleeve and FIGS. 3B and 3C are views showing an insert.

FIG. 3A is a perspective view of the sleeve 1. A plurality of through holes 12 each having a female-thread is provided at equal angular intervals (for example, at intervals of 90 degrees) from the outer circumferential surface of the sleeve 1 toward the inner cylindrical surface 11a. Each bolt 4 has a head part 41, a body part 42 and a tail part 43, and the body part 42 is screwed into a bolt hole 12. The body part 42 has a male thread on an area 42a screwed in the through hole 12, and other area 42b is formed in a cylindrical surface. The tail part 43 has a conical male taper surface with a taper angle θ1.

Referring back to FIGS. 2A and 2B, the pressure pipe 2 is cut to a certain length that is suited to a placement site, and thereafter, a groove 23 is machined so as to separate from an end part by a distance S. Although the depth of the groove 23 depends on a thickness and a caliber of the pressure pipe 2, the width W of the groove 23 must be at least equal or larger than the residual wall thickness t3. The groove 23 can be cut using a lathe. For example, the groove 23 is formed by pressing a cutting tool to the pressure pipe 2 and cutting as rotating the pressure pipe 2 or the cutting tool around a center line C.

Figure 4A:
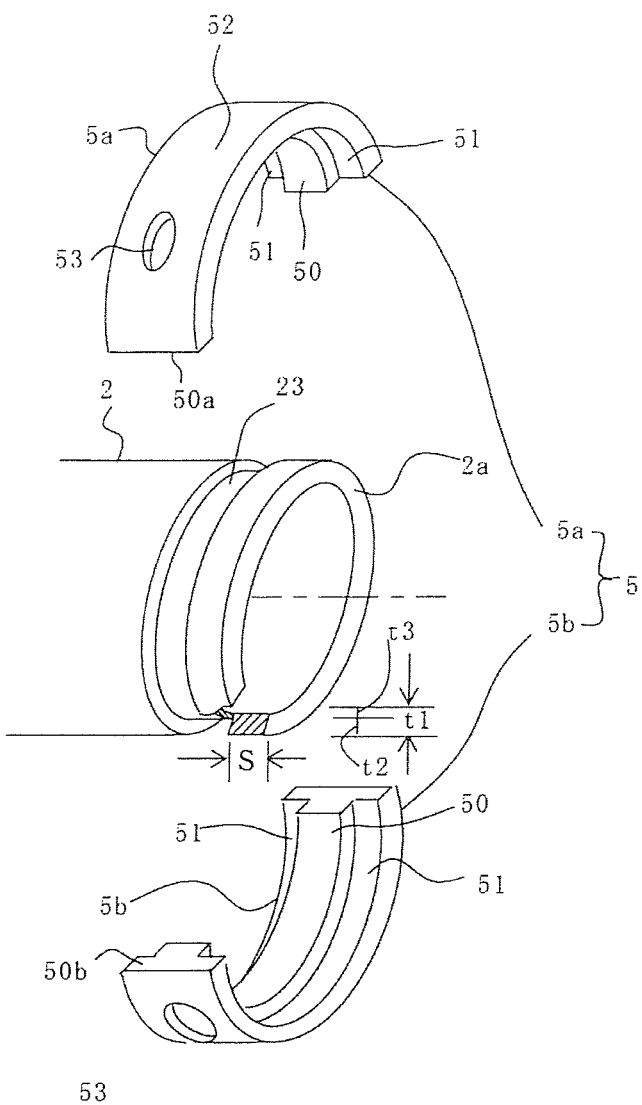
FIGS. 4A and 4B are views showing a preferred form of a ring.

FIG. 4A is a perspective view of the end part of the pressure pipe 2 having the groove 23. The distance S is at least equal or larger than the residual wall thickness t3. The groove 23 makes a circle with the same width on the entire circumference of the pressure pipe 2.

Figure 4B:
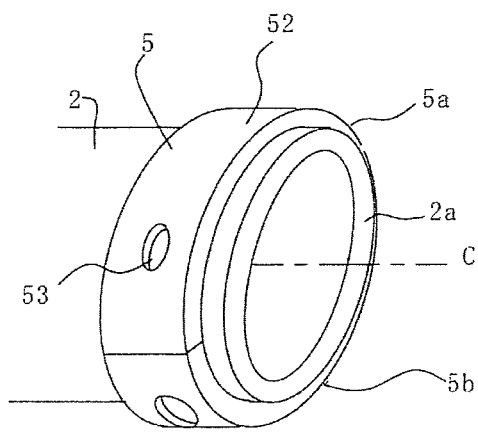

The ring 5 includes arc members 5a and 5b each having 180 degrees, and each of the arc members 5a and 5b has a projecting part 50 to be fitted in the groove 23. The inner diameter of the projecting part 50 is smaller than the outer diameter of the pressure pipe 2 and larger than the inner diameter thereof. The inner diameter of the projecting part 50 is made equal to the diameter of the groove 23. The projecting part 50 is fitted in the groove 23 formed on the pressure pipe 2, and the end surfaces 50a and 50b of the arc members 5a and 5b are respectively matched to each other to form a ring for surrounding the pressure pipe 2 (FIG. 4B). In this manner, a portion 51 other than the projecting portion 50 of the inner circumferential surfaces of the arc members 5a and 5b is in contact with the outer circumferential surface of the pressure pipe 2. Non-penetrating holes 53 are bored on the outer circumferential surface 52 of the ring 5 at equal angular intervals. The non-penetrating holes 53 are respectively provided corresponding to the positions of the through holes 12 of the sleeve 1.

Referring back to FIGS. 2A and 2B, the non-penetrating hole 53 includes a portion 53a formed from an inner cylindrical surface having no threads and a portion 53b formed from a conical female taper surface continuing to the back of the portion 53a. The area 42b of the bolt 4 is inserted into the portion 53a, and the tail part 43 is inserted into the portion 53b. The taper angle θ1 of the portion 53b is equal to the taper angle θ1 of the tail part 43 of the bolt 4.

When fitting the ring 5 on the pressure pipe 2 and inserting the end surface 2a of the pressure pipe 2 into the hollow 10 of the sleeve 1, the inner cylindrical surface 11a of the sleeve 1 is externally fitted on and made in contact with the outer circumferential surface 52 of the ring 5 on the entire circumference. Besides, the step 11b abuts against the ring 5. This state is shown in left side of FIG. 2A. The insert 3 is inserted into the hollow 10 of the sleeve 1. The insert 3 seals the end surface 2a of the pressure pipe 2.

Figure 3B:
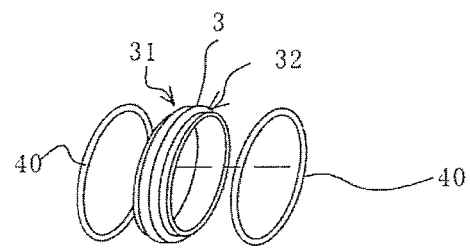
Figure 3C:
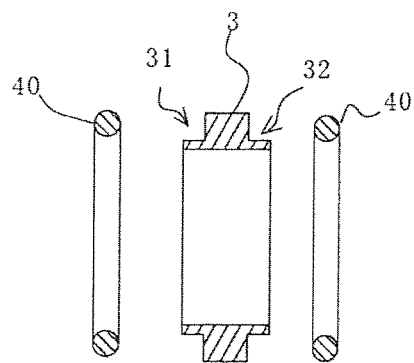

FIG. 3B is a perspective view of the insert 3, and FIG. 3C illustrates a cross section of the insert 3. The insert 3 has step-like grooves 31 and 32 that make a circle respectively on both sides. The outer diameter of the insert 3 is equal to the inner diameter of the hollow 10 of the sleeve 1. The O-rings are installed into the step-like grooves 31 and 32. In a state where the pressure pipe 2 is inserted into the sleeve 1, when the insert 3 having the O-rings 40 installed in the step-like grooves 31 and 32 is inserted into the hollow 10 of the sleeve 1 from an opposite side, the end surface 2a of the pressure pipe 2 is brought in contact with the O-ring 40.

Further, as shown in FIG. 2B, the pressure pipe 2' fitted with the ring 5 is inserted from the opposite side of the pressure pipe 2. The end surface 2a of the pressure pipe 2' abuts against the O-ring 40 and is shifted in a direction along the center line C, and the through holes 12 of the sleeve 1 and the corresponding non-penetrating holes 53 of the ring 5 are shifted to align with each other.

In this state, the bolts 4 are screwed into the through holes 12. In the process that the male taper surface of the tail part 43 of the bolt 4 slides and enters the female taper surface of the non-penetrating hole 53, the pressure pipe 2' enters the hollow 10 of the sleeve 1 to compress the O-rings 40 between the end surfaces 2a and the grooves 31 and 32. When the bolt 4 finishes being screwed, the O-rings 40 are in a state that a proper compaction force is applied.

Although the ring 5 includes the arc members 5a and 5b each having 180 degrees in this example, the ring 5 can be divided into a plurality of arc members each having 180 degrees or smaller if the total angle becomes 360 degrees.

Example 2

Figure 5A:
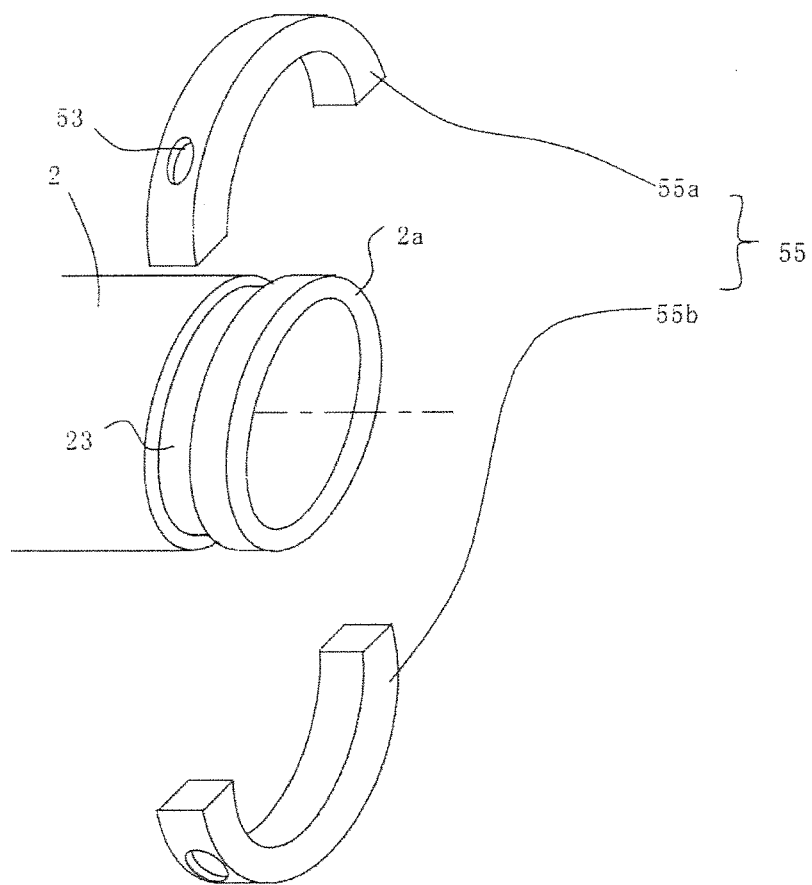
FIGS. 5A and 5B are views showing another embodiment.
Figure 5B:
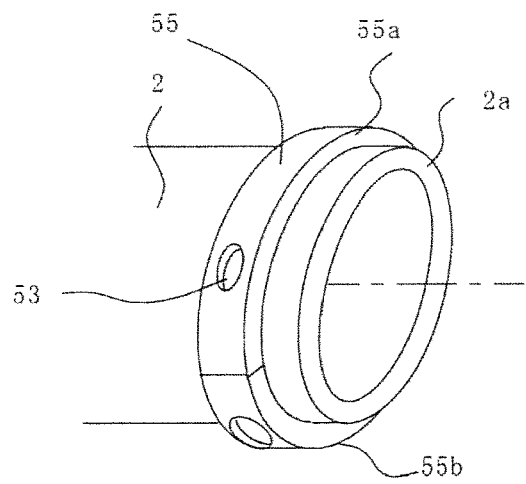

Example 2 is shown in FIGS. 5A and 5B. In Example 1, the cross section of the ring 5 has the projecting part 50 which is T-shaped in cross-section, whereas in this example, a ring 55 has a rectangular cross section. The ring 55 includes arc members 55a and 55b that form a circle. The ring 55 has the same non-though holes 53 as the ring 5 has. In comparison with the ring 5, the ring 55 is inferior in terms of strength because the ring 55 has no portion 51 being in contact with the outer circumferential surface of the pressure pipe 2. However, there is an advantage that the production cost is reduced because the portion 51 need not be molded.

Example 3

Figure 6A:
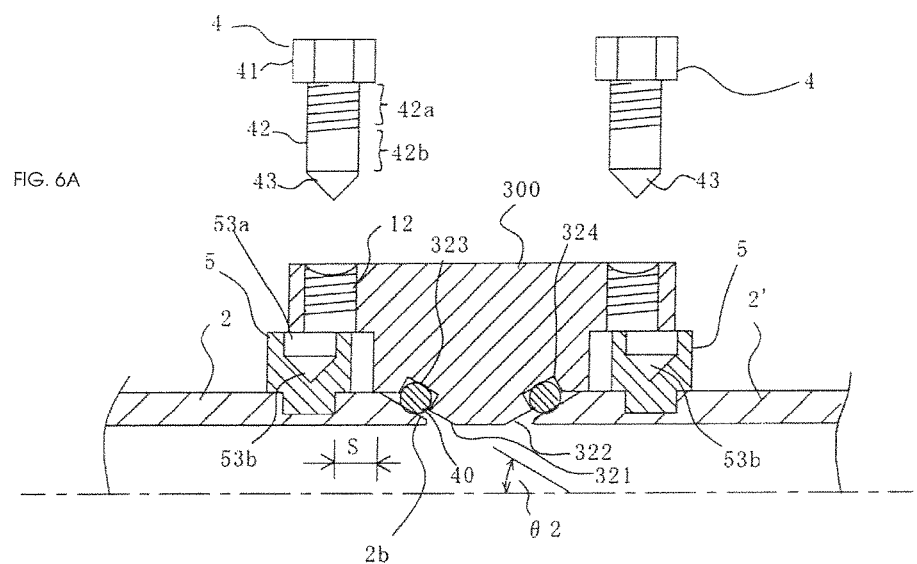
FIGS. 6A, 6B, 6C and 6D are views showing a connection structure of a further embodiment.
Figure 6B:
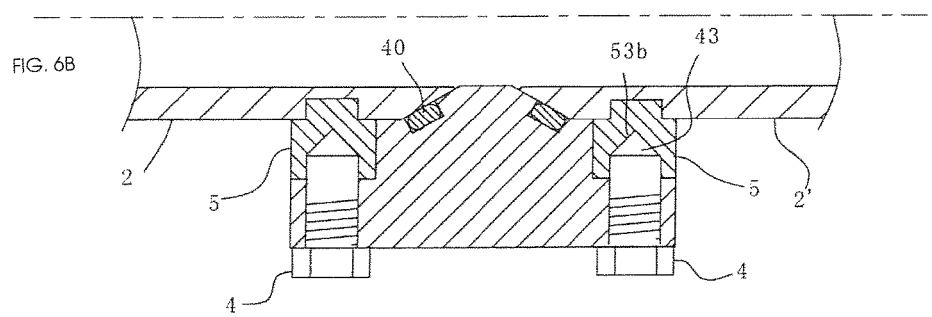
Figure 6C:
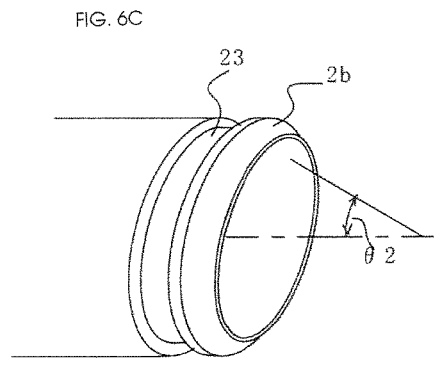
Figure 6D:
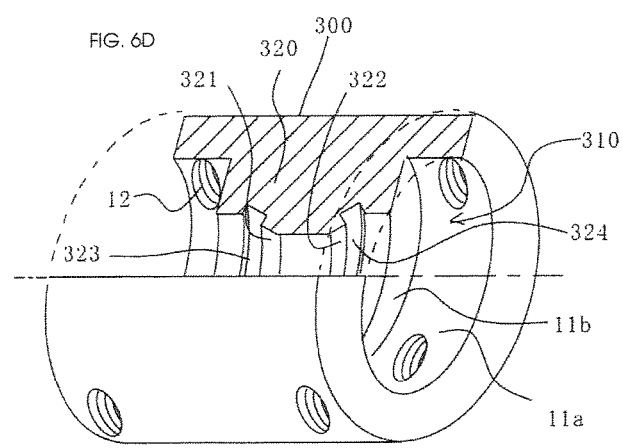

Although the insert 3 for housing the O-ring 40 is independent of the sleeve 1 in Example 1, the insert 3 in Example 3 depicted in FIGS. 6A, 6B, 6C and 6D is integrated with a sleeve 300. In this case, in order to house the O-ring 40 having as large a diameter as possible, the end part of the pressure pipe 2 is machined into the male taper surface $2b$ inclined at the taper angle $\theta 2$ (FIG. 6C), and female taper surfaces 321 and 322 for receiving the male taper surface $2b$ are provided on the sleeve 300 (FIG. 6D). A hollow 310 of the sleeve 300 includes a projecting portion 320 projecting to a position of the radius equal to the inner diameter of the pressure pipe 2. The projecting portion 320 has the female taper surfaces 321 and 322 toward the exits of the hollow 310 of the sleeve 300, and O-ring grooves 323 and 324 for housing the O-rings 40 are provided in the middle of the female taper surfaces 321 and 322, respectively. The female taper surfaces 321 and 322 are in surface contact with the male taper surface $2b$ of the pressure pipe 2, so that the taper angle is set to $\theta 2$. The groove 23 is machined on the rear side of the male taper surface $2b$ so as to be separated by at least a distance corresponding to the thickness of the groove portion of the pressure pipe 2.

The bolt 4 and the ring 5 are the same as for Example 1, and the sleeve 300 has screwed through holes 12 at positions corresponding to the non-penetrating holes 53 of the ring 5 as well as the sleeve 1.

The O-rings 40 are installed in the O-ring grooves 323 and 324, and thereafter, the pressure pipes 2 and 2' with the rings 5 are respectively inserted from both ends of the sleeve 300 (FIG. 6A). The male taper surfaces $2b$ of the pressure pipes 2 and 2' abut on the O-rings 40, and the through holes 12 of the sleeve 300 are communicated with the corresponding non-penetrating holes 53 of the ring 5 in the direction of the center line C.

In this state, when the bolts 4 are screwed into the through holes 12, the O-rings 40 are compressed between the male taper surfaces $2b$ of the pressure pipes 2 and 2' and the bottom surfaces of the O-ring grooves 323 and 324 in the process when the tail parts 43 of the bolts 4 enter into the portions formed of the conical peripheral surfaces of the non-penetrating holes 53. After the bolts 4 finish being screwed, proper compression forces are applied on the O-rings 40 (FIG. 6B).

Example 4

Although the above-mentioned examples show connection structures for connecting the pressure pipes 2 and 2', the present example shows a connection structure by flange joint.

Figure 7A:
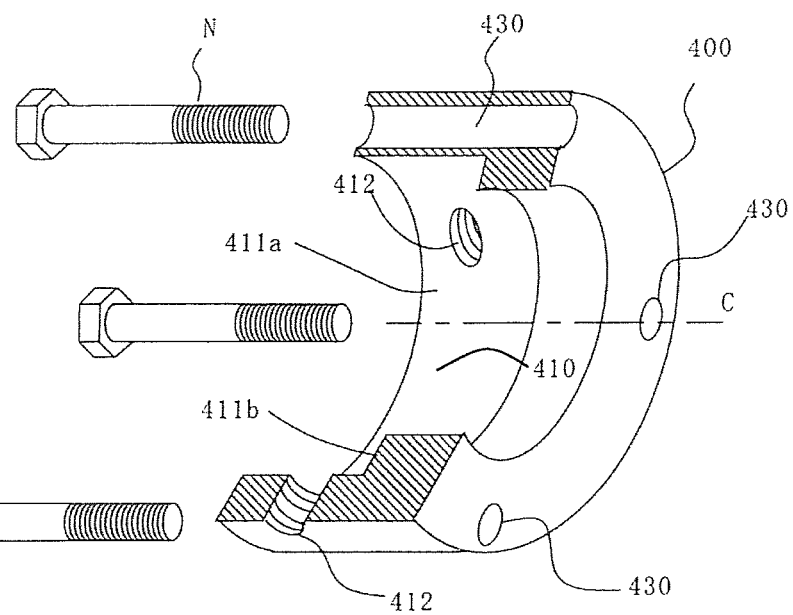
FIGS. 7A and 7B are views showing a connection structure of another embodiment utilizing a flange joint.
Figure 7B:
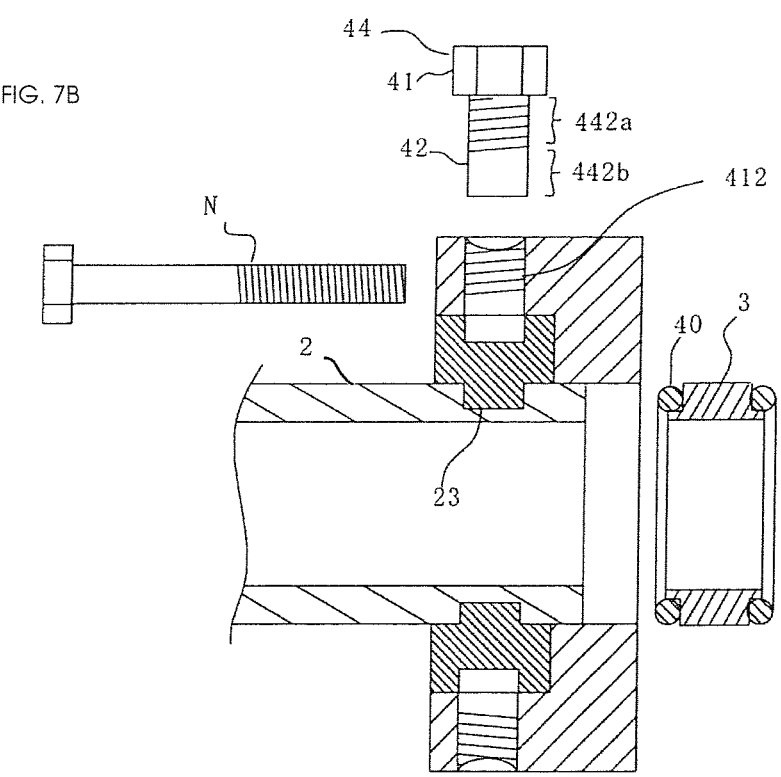

In FIGS. 7A and 7B, a groove 23 is formed on a pressure pipe 2 similar to Example 1. Besides, an insert 3 and a ring 5 are also formed in the same manner as Example 1.

A flange 400 is a linear cylindrical pipe having a hollow 410, into which the pressure pipe 2 is externally fitted, and to an entrance of the hollow 410, a step $411b$ is provided so as to retreat radially outside on the entire circumference. The step $411b$ radially retreats from the hollow 410 and reaches an inner cylindrical surface $411a$ facing forwardly toward the outer circumference of the pressure pipe 2.

A plurality of through holes 412 having threads is bored from the outer circumferential surface of the flange 400 toward the inner cylindrical surface $411a$ at equal angular intervals. Further, the flange 400 has a plurality of horizontal holes 430 in the direction of the center line C of the hollow 410 at equal angular intervals. The pressure pipe is connected to other machinery with tightening bolts N by using the horizontal holes 430.

Bolts 44 are screwed into the through holes 412. A body part 442 of a bolt 44 has an area $442a$ with cut male threads to be screwed in the through hole 412, and other area $442b$ forming a cylindrical surface. On the other hand, the bolt 44 has no conical tail parts 43 unlike the bolt 4.

The compression of the O-rings 40 of the insert 3 is achieved by using the bolts inserted into the horizontal holes 430.

Example 5

Figure 8A:
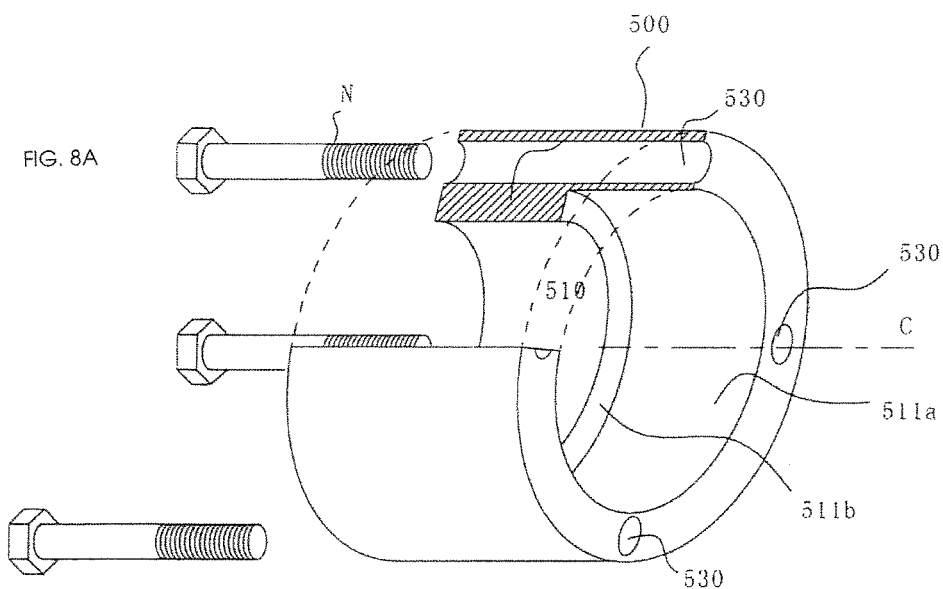
FIGS. 8A, 8B and 8C are views showing a connection structure of a further embodiment utilizing a flange joint.
Figure 8B:
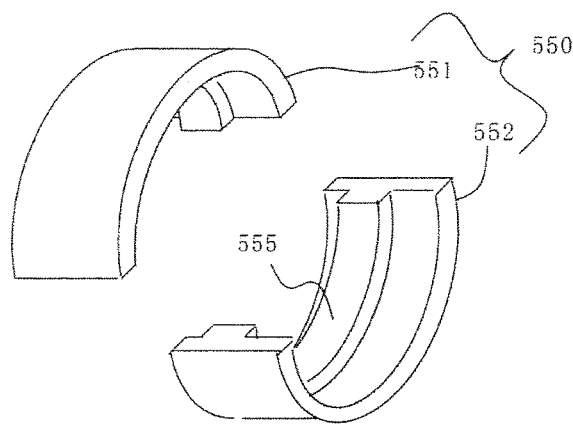
Figure 8C:
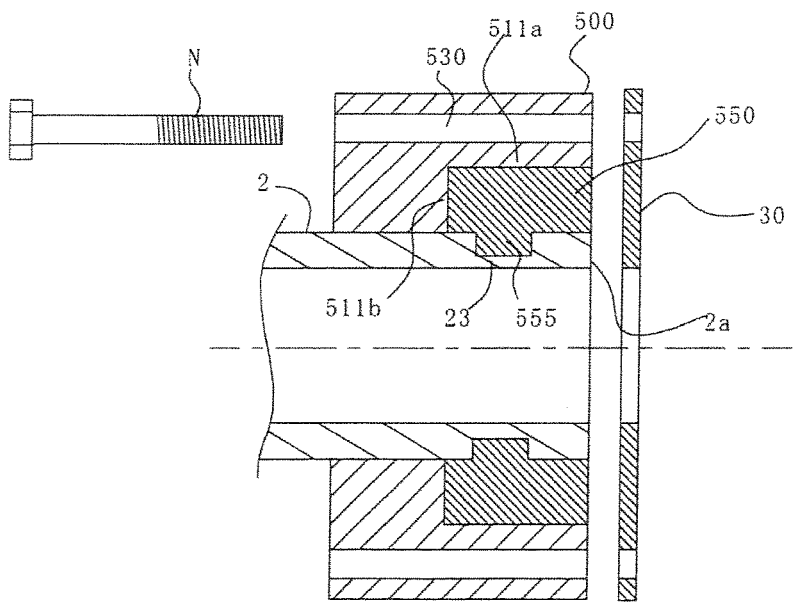

Example 5 illustrated in FIGS. 8A, 8B and 8C showing a connection structure for fitting a flange to the pressure pipe 2 as with Example 4.

A flange 500 is a linear cylindrical pipe having a hollow 510 externally fitted to the pressure pipe 2, and to an entrance of the hollow 510, a step $511b$ is provided so as to radially retreat outside on the entire circumference. The step $511b$ radially retreats from the hollow 510 and reaches an inner cylindrical surface $511a$ externally fitting onto the outer circumference of the pressure pipe 2. The flange 500 has no through holes 412 in the flange 400. The flange 500 has a plurality of horizontal holes 530 in the direction of the center line C at equal angular intervals. The pressure pipe is connected to other machinery with tightening bolts N by using the horizontal holes 530.

On the other hand, a ring 550 is similar to the ring 5 except for having no non-penetrating holes 53, namely, the ring 550 includes a plurality of arc members 551 and 552 and has a projection portion 555 fitted into the groove 23 of the pressure pipe 2.

The flange 500 is externally fitted to the pressure pipe 2 cut in the certain length as well as having the groove 23 cut adjacent the end so that the inner cylindrical surface $511a$ is positioned near the end surface $2a$. After fitting the arc members 551 and 552 in the groove 23 of the pressure pipe 2, the flange 500 externally fitted to the pressure pipe 2 is displaced at a position of the ring 550 to oppose the ring 550 to the inner cylindrical surface $511a$. The pressure pipe is connected to other machinery and so on via a gasket 30 by using the plurality of horizontal holes 530.

Example 6

Figure 9:
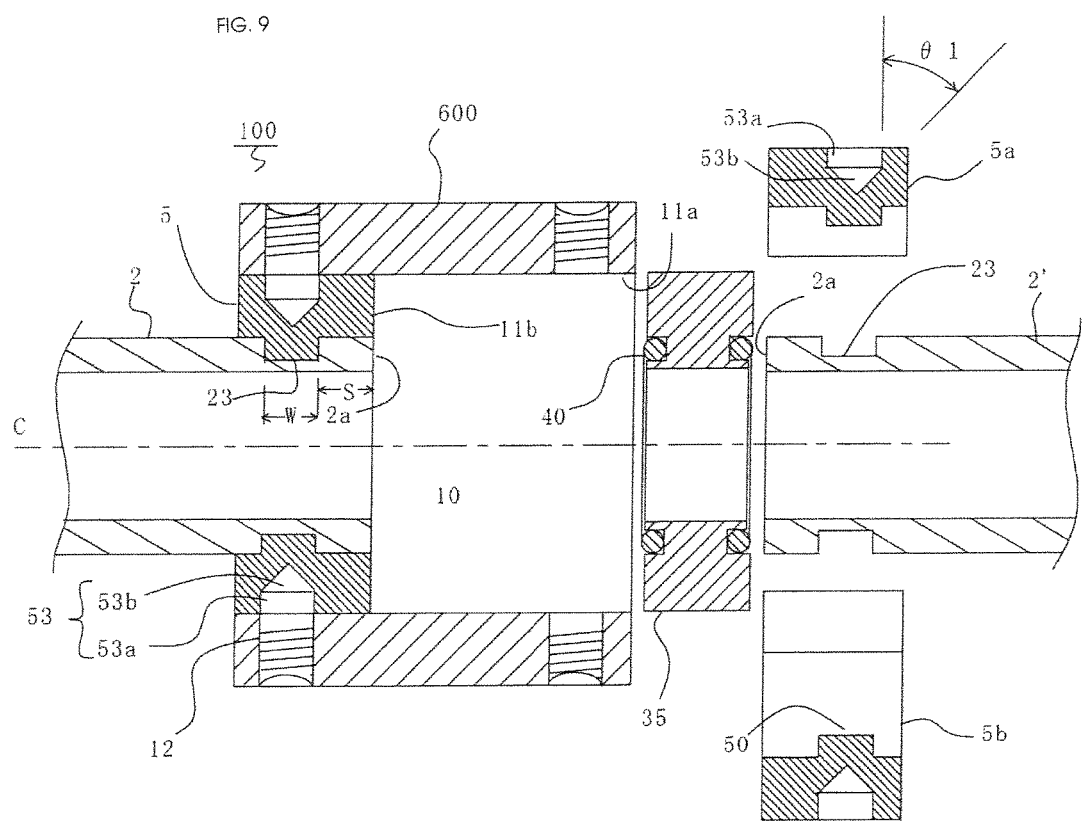
FIG. 9 is a view showing a connection structure of an embodiment utilizing a sleeve joint.

Although Example 6 illustrated in FIG. 9 refers to an example of a sleeve joint for connecting pressure pipes as with Example 1, it is different from Example 1 in that a sleeve 600 is shaped in a cylindrical form equal to the outer circumference of the ring 5 on the entire length and an insert 35 has an outer diameter equal to the outer circumference of the ring 5 unlike the insert 3. The other configurations in Example 6 are the same as Example 1.

Example 7

Figure 10A:
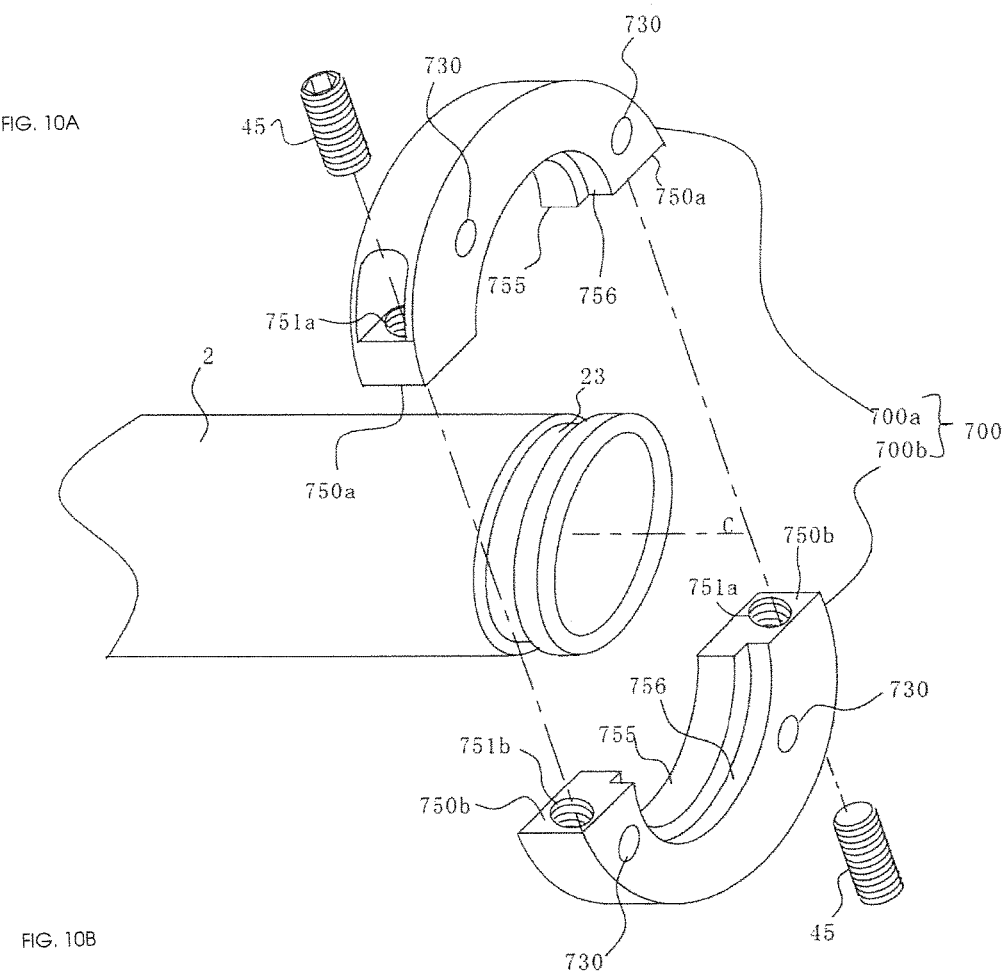
FIGS. 10A and 10B are views showing an example of connection utilizing a flange joint.
Figure 10B:
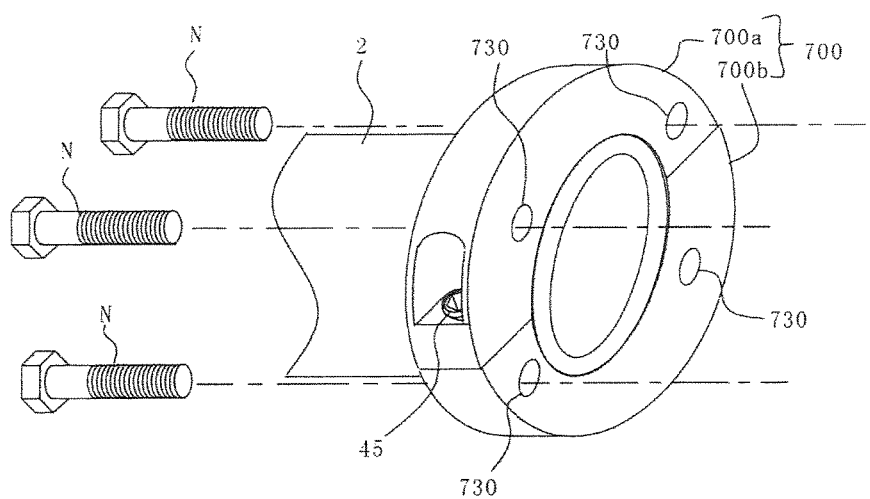

Example 7 illustrated in FIGS. 10A and 10B also shows a connection structure for fitting a flange to the pressure pipe 2 as with Examples 4 and 5.

A flange 700 includes semicircular arc members $700a$ and $700b$, which have protrusion parts 755 fitted into the groove 23 respectively. The arc members $700a$ and $700b$ have the same shape. An inner diameter of a protrusion part 755 is smaller than the outer diameter of the pressure pipe 2 and larger than the inner diameter thereof. The inner diameter of the protrusion part 755 is equal to the diameter of the groove 23. The arc members $700a$ and $700b$ are formed in a ring to surround the pressure pipe 2 by fitting the protrusion parts 755 into the groove 23 formed on the pressure pipe 2 and matching end surfaces $750a$ and $750b$ of the arc members 700a and 700b, respectively (FIG. 10B). In this manner, portions other than the protrusion parts 755 on the inner circumferential surfaces of the arc members 700a and 700b are in contact with the outer circumferential surface of the pressure pipe 2. Besides, the end surfaces 750a and 750b are respectively provided with screw holes 751b having threads and the screw holes 751a passing through the outer circumferences thereof, so that the arc members 700a and 700b can be connected and fixed with headless screws 45. Further, the flange 700 has a plurality of horizontal holes 730 in a direction of a center line C of a circle composed of the arc members 700a and 700b at equal angular intervals. The pressure pipe is connected to other machinery with tightening bolts N by using the horizontal holes 730.

In this manner, the flange 700 has the function of the ring 5 in Example 4 and the ring 550 in Example 5.

In FIGS. 11A, 11B and 11C, the flange 700 of Example 7 is connected to a connector 810 of other machinery 800. An insert 850, unlike the insert 3, has a diameter equal to the outer circumference of the flange 700 and includes horizontal through holes 860 at positions corresponding to the horizontal holes 730. The flange 700 is connected by screwing bolts N into bolt holes 830 of the other machinery through the horizontal holes 730. The gasket 30 shown in FIG. 8 may be used in place of the insert 850.

DESCRIPTION OF THE REFERENCE NUMERALS 1, 300, 600 sleeve
2, 2' pressure pipe
2a end surface
2b male taper surface
3, 35, 850 insert
4 bolt
5, 55, 550 ring
10 hollow
11a inner cylindrical surface
11b step
12, 412 through hole
23 groove
40 O-ring
50a, 50b end surface
53 non-penetrating hole
400, 500, 700 flange

The invention claimed is:

1. A pressure pipe connection method for connecting at least one pressure pipe to at least one other member, wherein said at least one pressure pipe is configured to allow pressurized fluid to flow in said at least one pressure pipe, said method comprising:
providing a plurality of arc members for forming a ring that makes a circle by matching end faces of said plurality of arc members, said ring having non-penetrating holes on an outer circumference and an inner diameter smaller than an outer diameter of the at least one pressure pipe and larger than an inner diameter of the at least one pressure pipe;
providing a cylindrical sleeve having a plurality of through holes with female threads penetrating through from an outside at positions corresponding to the non-penetrating holes, said cylindrical sleeve having an inner cylindrical surface for externally fitting the outer circumference of the ring on an entire circumference of the cylindrical surface in an inside hollow where the at least one pressure pipe is inserted into one end of the cylindrical sleeve;
providing a plurality of bolts for being screwed into the through holes of the sleeve;
cutting the at least one pressure pipe to a certain length that is suited to a placement site;
cutting a groove corresponding to the plurality of arc members on a position removed from the cut end of the at least one pressure pipe;
fitting the plurality of arc members into the groove to form the ring;
inserting the at least one pressure pipe into the hollow inside the cylindrical sleeve and positioning the plurality of arc members fitted in the groove against the inner cylindrical surface so that the through holes and the non-penetrating holes communicate with each other; and
fixing the at least one pressure pipe to the cylindrical sleeve through the through holes of the cylindrical sleeve using the bolts.

2. The pressure pipe connection method claimed in claim 1, wherein each of the non-penetrating holes of the ring has a conical female taper surface, and each bolt has a tail part being provided with a male taper surface corresponding to the female taper surface, and an O-ring located adjacent the at least one pressure pipe is compressed in a process of the bolt male taper surface entering the female taper surface of the ring.

3. The pressure pipe connection method claimed in claim 2, wherein an insert having an O-ring groove for accommodating the O-ring is inserted in the inside hollow of the cylindrical sleeve.

4. A method for constructing pressure pipes with a flange, wherein the pressure pipes are configured to allow pressurized fluid to flow in the pressure pipes, said method comprising:
providing a plurality of arc members configured to form a ring that makes a circle by matching end faces of said plurality of arc members, said ring having non-penetrating holes on an outer circumference and an inner diameter smaller than an outer diameter of the pressure pipes and larger than an inner diameter of the pressure pipes;
providing a cylindrical flange, said cylindrical flange having an inner cylindrical surface for externally fitting the outer circumference of the ring on an inside hollow of said cylindrical flange where the pressure pipes are inserted from opposing entrances of said cylindrical flange, said cylindrical flange having a plurality of through holes with female threads penetrating through from an outside at positions corresponding to the non-penetrating holes, and horizontal holes bored on a circumference of said cylindrical flange at equal angular intervals in a direction of a center line of the inside hollow;
providing a plurality of bolts for being screwed into the through holes of the flange;
cutting the pressure pipes to a certain length that is suited to a placement site;
cutting a groove corresponding to the plurality of arc members at a position removed from the cut end of one of the pressure pipes;
fitting the arc members into the groove to form the ring;
inserting the pressure pipes into the inside hollow of the cylindrical flange and positioning the plurality of arc members fitted into the groove against the inner cylindrical surface so that the through holes and the non-penetrating holes communicate with each other; and fixing one of the pressure pipes through the through holes of the cylindrical flange using the bolts.

5. A method for constructing one or more pressure pipes with a flange, wherein the one or more pressure pipes are configured to allow pressurized fluid to flow in the one or more pressure pipes, said method comprising:
- providing a plurality of arc members configured to form a ring that makes a circle by matching end faces of said plurality of arc members, said ring having an inner diameter smaller than an outer diameter of a pressure pipe and larger than an inner diameter of the pressure pipe;
- providing a cylindrical flange, said cylindrical flange having an inner cylindrical surface for externally fitting an outer circumference of the ring through a step extending outwardly in a radial direction from an inside hollow of said cylindrical flange over an entire circumference of said cylindrical flange wherein the inside hollow is configured to receive a pressure pipe by inserting the pressure pipe from an exterior of said cylindrical flange into a corresponding portion of the inside hollow, and horizontal holes bored on a circumference of said cylindrical flange at equal angular intervals in a direction of a center line of the inside hollow;
- cutting the pressure pipe to a certain length that is suited to a placement site;
- cutting a groove corresponding to the plurality of arc members at a position removed from the cut end of the pressure pipe;
- positioning the inner cylindrical surface of the cylindrical flange about a portion of the pressure pipe where the ring is removed from the step, and then inserting the pressure pipe into the inside hollow;
- fitting the arc members into the groove to form a ring; and
- making the step in contact with the ring to position the ring fitted into the groove against the inner cylindrical surface.

6. The method of claim 5, wherein when the fitting step of claim 5 is performed the groove is disposed outside of said cylindrical flange.

* * * * *